United States Patent
Cromer et al.

(10) Patent No.: US 7,185,229 B2
(45) Date of Patent: Feb. 27, 2007

(54) METHOD AND SYSTEM FOR PERFORMING REMOTE MAINTENANCE OPERATIONS ON A BATTERY POWERED COMPUTER

(75) Inventors: Daryl Carvis Cromer, Apex, NC (US); Howard Jeffrey Locker, Cary, NC (US); Randall Scott Springfield, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 10/727,865

(22) Filed: Dec. 4, 2003

(65) Prior Publication Data
US 2005/0138470 A1 Jun. 23, 2005

(51) Int. Cl.
*G06F 11/00* (2006.01)

(52) U.S. Cl. ............... 714/22; 713/300; 713/320; 713/340

(58) Field of Classification Search .......... 714/22; 713/300, 320, 340
See application file for complete search history.

(56) References Cited

U.S. PATENT DOCUMENTS

| | | | |
|---|---|---|---|
| 4,980,836 A * | 12/1990 | Carter et al. ............... | 713/322 |
| 5,339,437 A | 8/1994 | Yuen | |
| 5,568,649 A | 10/1996 | MacDonald et al. | |
| 5,864,656 A | 1/1999 | Park | |
| 6,212,592 B1 | 4/2001 | Klein | |
| 6,216,183 B1 | 4/2001 | Rawlins | |
| 7,051,236 B2 * | 5/2006 | Sanu ........................... | 714/22 |
| 2003/0233587 A1 * | 12/2003 | Sanu ........................... | 713/300 |
| 2004/0003302 A1 * | 1/2004 | Marshall et al. ............ | 713/300 |
| 2004/0205123 A1 * | 10/2004 | Terasawa ..................... | 709/203 |

FOREIGN PATENT DOCUMENTS

JP 2001344185 A 12/2001

OTHER PUBLICATIONS

David R. Cheriton, The V Distributed System, Communications of the ACM, Special Section, Mar. 1998, No. 3.
Power on Self Test Complete Alert for Remote Management System Level Maintenance, IBM Technical Disclosure Bulletin, IBM Corporation, 1997, p. 131.

* cited by examiner

*Primary Examiner*—Robert Beausoliel
*Assistant Examiner*—Charles Ehne
(74) *Attorney, Agent, or Firm*—David R. Irvin; Dillon & Yudell LLP (57) ABSTRACT

A method and system is described for remotely managing a battery powered client computer. A data packet, which includes a set of instructions, is sent to the client computer from a managing computer. Included in the data packet is a field indicating how much computing time is needed to execute the set of instructions. If the client computer is operating on battery power, the client computer determines if there is enough battery life remaining to execute the set of instructions. If not, then the set of instructions are disregarded.

17 Claims, 7 Drawing Sheets

METHOD AND SYSTEM FOR PERFORMING REMOTE MAINTENANCE OPERATIONS ON A BATTERY POWERED COMPUTER

BACKGROUND OF THE INVENTION

1. Technical Field

This invention relates generally to network computing systems, and in particular to remotely managed client computers. Still more particularly, the present invention relates to a method and system for determining if a client computer, which is operating on battery power, has enough remaining battery power to execute a maintenance application ordered by a remote managing computer.

2. Description of the Related Art

While early computers were "stand alone" and unable to communicate with other computers, most computers today are able to communicate with other computers for a variety of purposes, including sharing data, e-mailing, downloading programs, coordinating operations, etc. Each computer typically connects to a network via a Network Interface Card (NIC) or an integrated Local Area Network (LAN) on Motherboard (LOM). The network couples multiple computers and/or peripheral devices (such as printers, secondary storage, etc.) The network may be a Local Area Network (LAN) or a Wide Area Network (WAN).

A LAN is a small local network, wired or wireless, that is typically used by a single enterprise. Such LANs, using architectures such, as an Ethernet, Token Ring, ARCnet or a wireless protocol such as 802.11a/b/g, are used to connect computers and peripheral devices within a limited area, such as a single campus or building.

Computers are not limited to the confines of a LAN. Rather, a computer can be connected to another computer or peripheral device via a Wide Area Network (WAN), such as the Internet, to provide a communications link over a larger area. Each computer can be directly connected to a WAN via a Network Interface Card (NIC) or LOM, or the computer can be indirectly connected to the WAN via the LAN. The WAN can be wired or wireless, similar to that described for the LAN.

Figure 1:
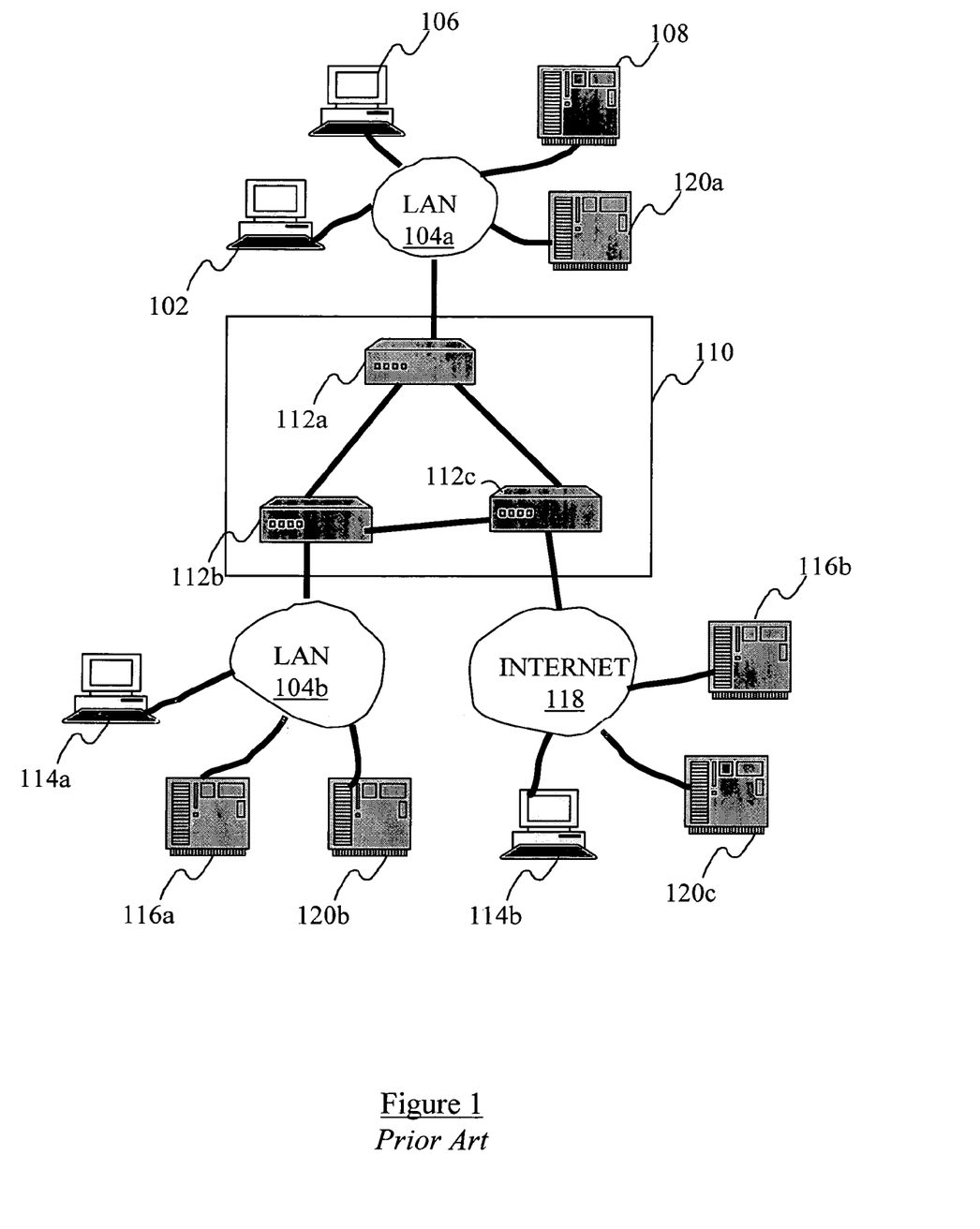
FIG. 1 is a schematic diagram illustrating a network of computers within which the present invention may find application.

A typical prior art system for interconnecting computers and computer networks is shown in FIG. 1. A local client computer 102 is interconnected to a number of other computers and networks as shown. Although illustrated as a desktop computer, local client computer 102 may be a wireless mobile computing device, such as a laptop computer, a Personal Digital Assistant (PDA), a cell phone, etc. Local client computer 102 is connected to other computers on a LAN 104a, on which other client computers 106 and local servers 108 are connected. Although connected to other computers on LAN 104a, local client computer 102 can be self-controlled, communicating with other computers only to share data. Alternatively, local client computer 102 may be under the management and/or control of a managing server 120.

Local client computer 102 can communicate with computers outside of LAN 104a. As depicted in FIG. 1, such communications are typically via a Wide Area Network (WAN) 110, which includes multiple routers 112. As depicted in an exemplary manner, a router 112a routes messages to and from computers on LAN 104a, while also communicating with other routers 112 that control communications with other computers or networks. For example, router 112a communicates with a router 112b, which directs traffic to another LAN 104b. Attached to LAN 104b are additional resources, such as peripheral devices (not shown), a remote computer 114a, a remote server 116a and a managing server 120b. Remote computer 114a may be another client computer for sharing data with client computer 102, while managing server 120b may be a server that controls/manages local client computer 102.

Router 112c connects router 112a and/or router 112b with an Internet 118, which is a public wide area network that is accessible worldwide. Internet 118 utilizes existing public telecommunications networks in conjunction with service provider routers that direct messages between computers, using a Transmission Control Protocol/Internet Protocol (TCP/IP). Connected to Internet 118 are various resources, including peripheral devices (not shown) as well as remote client computers 114b, remote servers 116b, and managing server 120c, which serve similar functions as remote client computers 114a, remote servers 116a, and managing server 120b.

A managing server, such as managing server 120a, 120b or 120c, may be the same as a local server 108 or a remote server 116. Managing server 120 is used to maintain local client computer 102. Such maintenance may include running diagnostic programs, upgrading software in whole (new program) or part (upgrades or patches), monitoring activity levels, testing and operating security features, including virus filters, etc. Managing server 120 can also remotely turn local client computer 102 off and on.

If local client computer 102 has unlimited power (is plugged into a wall socket), then power usage requirements are of little concern. However, many computers are often, if not always, only on battery power. For example, a laptop, notebook or tablet computer is designed to normally run on battery power, as are Personal Digital Assistance (PDA) devices. In addition, other computers that are designed to normally be plugged into a wall socket, including mission critical computers and servers, may be on emergency battery back-up power, such as an uninterruptible power supply (UPS), when contacted by a managing server 120.

If a computer, whether that be local client computer 120 or any other client computer or server, operating on battery power executes a maintenance operation ordered by a management server 120 without having enough battery life left to complete the maintenance operation, then serious problems can arise. Execution of the maintenance operation often causes interim changes to primary and secondary memory, operating system image and files, registers, settings of peripheral devices, and other conditions and flags which, if the maintenance operations is not fully completed, can cause serious operational limitations or failure of the computer.

Therefore, there is a need for an improved method and system for performing a maintenance operation or executing another remotely ordered operation on a computer that is on battery power, where there is an assurance that the computer has enough battery power left to complete the operation.

SUMMARY OF THE INVENTION

As will be seen, the foregoing invention satisfies the foregoing needs and accomplishes additional objectives. Briefly described, the present invention provides a method and system for remotely managing a client computer while ensuring that management operations ordered can be fully completed on a remaining battery life of the client computer.

A data packet, which includes a set of instructions, is sent to the client computer from a managing computer via a network connection, which may be to a wired or wireless network. Included in the data packet is a field indicating how much computing time is needed to execute the set of instructions such as a maintenance application. If the client computer is operating on battery power, the client computer determines if there is enough battery life remaining to execute the set of instructions. If not, then the set of instructions are disregarded.

In a preferred embodiment, the management computer first determines if the client computer is in a "sleep" mode. If so, then the management computer determines whether the client computer can be safely "awaken" using the limited battery power, leaving enough battery power to fully execute the maintenance application and then return the client computer to the original "sleep" mode or an even lower power consumption level.

BRIEF DESCRIPTION OF THE DRAWINGS

The novel features believed characteristic of the invention are set forth in the appended claims. The invention itself, however, as well as the preferred modes of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Referring now to the drawing figures, in which like numerals indicate like elements or steps throughout the several views, the preferred embodiment of the present invention will be described. In general, the present invention provides an improved method and system for remotely ordering a maintenance application or other software execution in a battery powered client computer on a network, such that the battery powered client computer is assured of having adequate battery life to complete execution of the ordered software.

Figure 2:
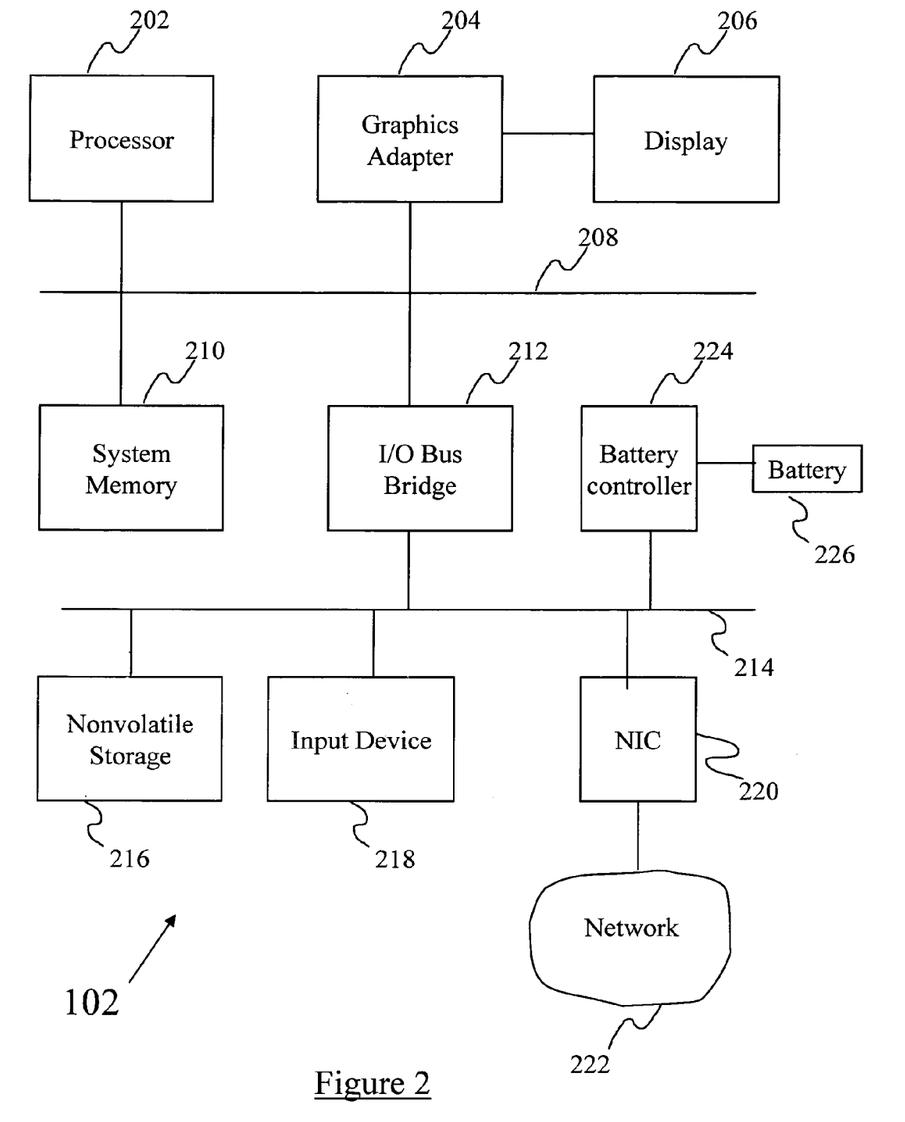
FIG. 2 is a block diagram of an exemplary client computer being controlled by a managing server.

With reference now to FIG. 2, there is depicted a block diagram of a preferred local client computer 102 shown in FIG. 1, on which the present invention may be implemented. Local client computer 102 may be, for example, one of the models of personal or server computers available from International Business Machines Corporation of Armonk, New York. Local client computer 102 includes a central processing unit (CPU) 202, which is connected to a system bus 208. In the exemplary embodiment, local client computer 102 includes a graphics adapter 204 also connected to system bus 208, for providing user interface information to a display 206.

Also connected to system bus 208 are a system memory 210 and an input/output (I/O) bus bridge 212. I/O bus bridge 212 couples an I/O bus 214 to system bus 208, relaying and/or transforming data transactions from one bus to the other. Peripheral devices such as nonvolatile storage 216, which may be a hard disk drive, and input device 218, which may include a conventional mouse, a trackball, or the like, is connected to I/O bus 214. A network interface card (NIC) 220 is connected to I/O bus 214, to provide data communication to a network 222, which may be a LAN, WAN or the Internet. Also connected to I/O bus 214 is a battery controller 224, which includes logic for determining the remaining battery power in a battery 226.

The exemplary embodiment shown in FIG. 2 is provided solely for the purposes of explaining the invention and those skilled in the art will recognize that numerous variations are possible, both in form and function. For instance, local client computer 102 might also include a compact disk read-only memory (CD-ROM) or digital video disk (DVD) drive, a sound card and audio speakers, and numerous other optional components. All such variations are believed to be within the spirit and scope of the present invention.

Figure 3:
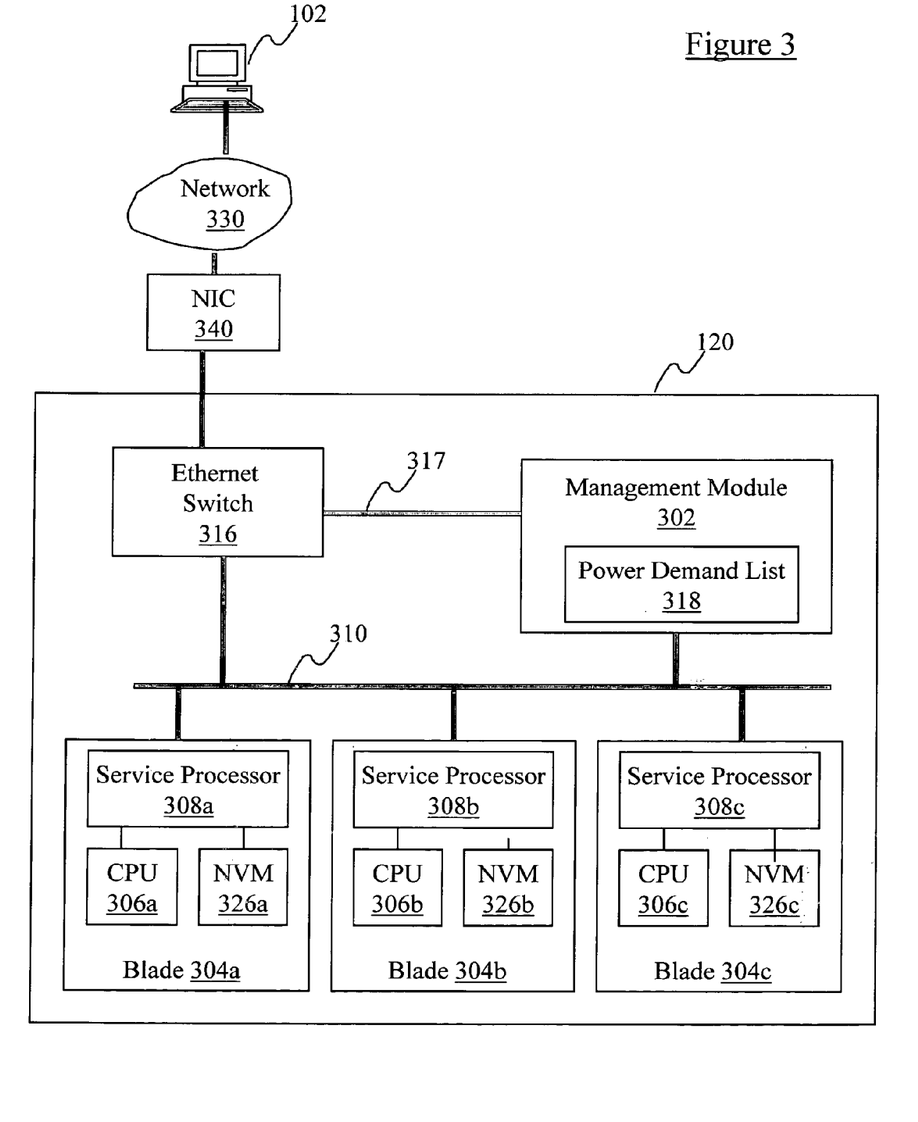
FIG. 3 is a block diagram of an exemplary managing server.

Referring now to FIG. 3, additional exemplary detail of managing server 120 is depicted. Managing server 120 includes a management module 302 that is coupled to multiple server blades, shown for exemplary purposes only as three server blades 304a–c, via a midplane 310. Midplane 310 contains at least one serial bus for secure internal communication between management module 302 and server blades 304a–c, as well as between server blades 304a–c themselves, via respective service processors 308a–c. Management module 302 also communicates with an Ethernet switch 316 via an internal secure serial bus 317 to control communication between local client computer 102 and server blades 304 as described below.

Each server blade 304 has at least one central processing unit (CPU) 306, and a non-volatile memory (NVM) 326. Each server blade 304 communicates with an external network 330, which may be a LAN, WAN or the Internet, via a Network Interface Card (NIC) 340 and Ethernet switch 316.

Management module 302 also has the capability of storing information in a power demand list 318 regarding the amount of power required to perform particular operations on local client computer 102, in order to compare the power requirement to execute a management application with the amount of remaining power in the battery. If sufficient battery power remains, then the management module 302 directs the execution of the management application. If there is not sufficient battery power remaining, then the management module 302 prohibits the execution of the management application.

The power demand list 318 includes a list of management applications, including maintenance applications to be run on local client computer 102. Associated with each listed application/operation is a power requirement defining how much power is required to fully execute the operation. This power requirement may be defined in a variety of ways, including the number of operations in the application. Alternatively, if the processor speed of local client computer 102 is known by managing server 120 (number of operations that can be performed per second by local client computer 102), then the power requirement is described in how much time is needed to complete the application.

In another preferred embodiment, if the managing server 120 knows not only how many operations can be performed per second, but also how much power is consumed per second by the local client computer 102 when the CPU 202 is operating at full capacity, then the power requirement is a true power requirement number, reflecting the amount of milliamperes needed to be available from battery 226. Alternatively, management module 302 can define the amount of time required based on a "known" configuration of client computer 102 (what the managing server 120 understands the client computer's configuration to be), and the client computer 102 has the capability of adjusting the time requirement if the actual configuration of client computer 102 differs from the known configuration of client computer 102.

Managing server 120, whether local (on the same LAN) or remote (not on the same LAN) to local client computer 102, can remotely perform a variety of managing operations on local client computer 102. For example, managing server 120 can order a device driver update, routine testing operations, install or run anti-virus software, examine workload levels, and other routine and special operations on local client computer 102. Such maintenance operations can encounter three main problems. First, local client computer 102 might be operating on battery power, and if so, may not have enough remaining battery charge to complete the ordered operation. Second, local client computer 102 might be asleep, or even turned off. Third, local client computer 102 might be too busy to perform the ordered operation.

While managing server 120 has been illustrated for exemplary purposes as a blade server, it is understood that managing server 120 may be any appropriately configured computing device, including any architecture of server or data processing system, including a client system as illustrated in FIG. 2. Thus, components of managing server 120 as illustrated may run on other hardware devices. For example, management module 302 is a software stack that can run on any properly configured data processing system, including a client computer, another architected server, etc.

Figure 4:
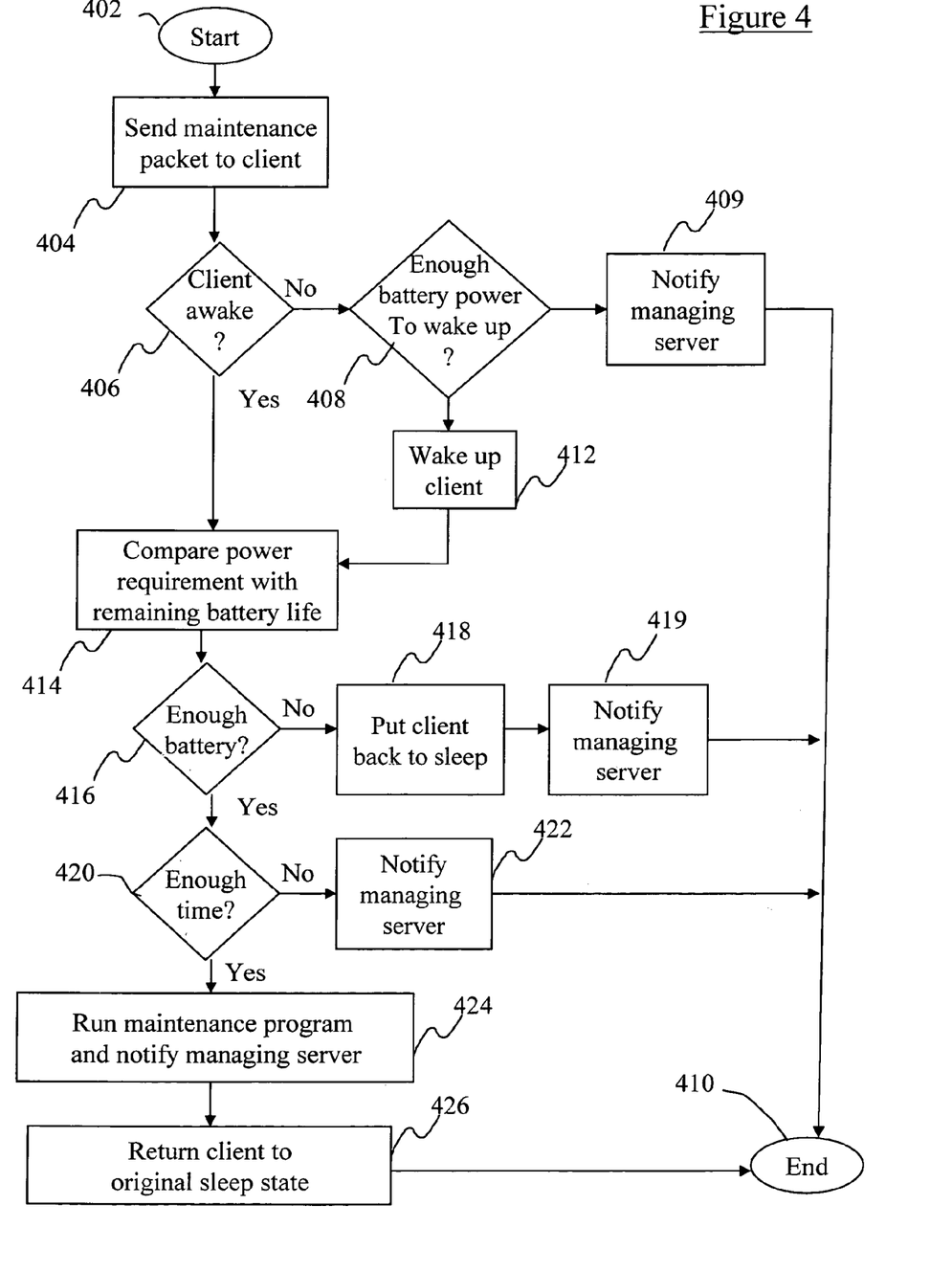
FIG. 4 is a flow chart of steps taken in a preferred embodiment of the present invention.

With reference now to FIG. 4, there is depicted a flowchart describing a preferred embodiment of the present inventive method. Following initiator block 402, a maintenance packet is sent from the managing server to a battery powered client computer (block 404). The maintenance packet may contain a maintenance application to be run, or it may contain an identifier or address of where the maintenance application can be located, whether in the client computer or some other location. A query (query block 406) is made to determine if the client computer is awake. If not, then a determination is made as to whether the client computer has enough battery life remaining to safely wake up the client computer (block 408). If not, then a message is sent to the managing server that the client computer does not have enough battery power to wake up (block 409), and the process terminates (terminator block 410). If the battery powered client computer has enough battery power to safely wake up, then it is awakened (block 412).

At block 414, a comparison is made between the power requirement described in the maintenance packet to the remaining battery life. A determination (query block 416) is made as to whether there is sufficient battery life remaining. If not, then the client computer is put back to sleep (block 418) and the managing server so notified (block 419). If there is enough battery power remaining, then a determination is made as to whether the client computer is currently too busy to execute the maintenance application (query block 420). If the client computer is currently too busy, then a message is sent to the managing server (block 422) to re-send the maintenance packet at a later time.

If the client computer is able to process the maintenance application, then it does so and notifies the managing server when the maintenance application is completed (block 424). The client computer then returns to its original sleep state (block 426), whatever that state was when the maintenance packet arrived.

Figure 5:
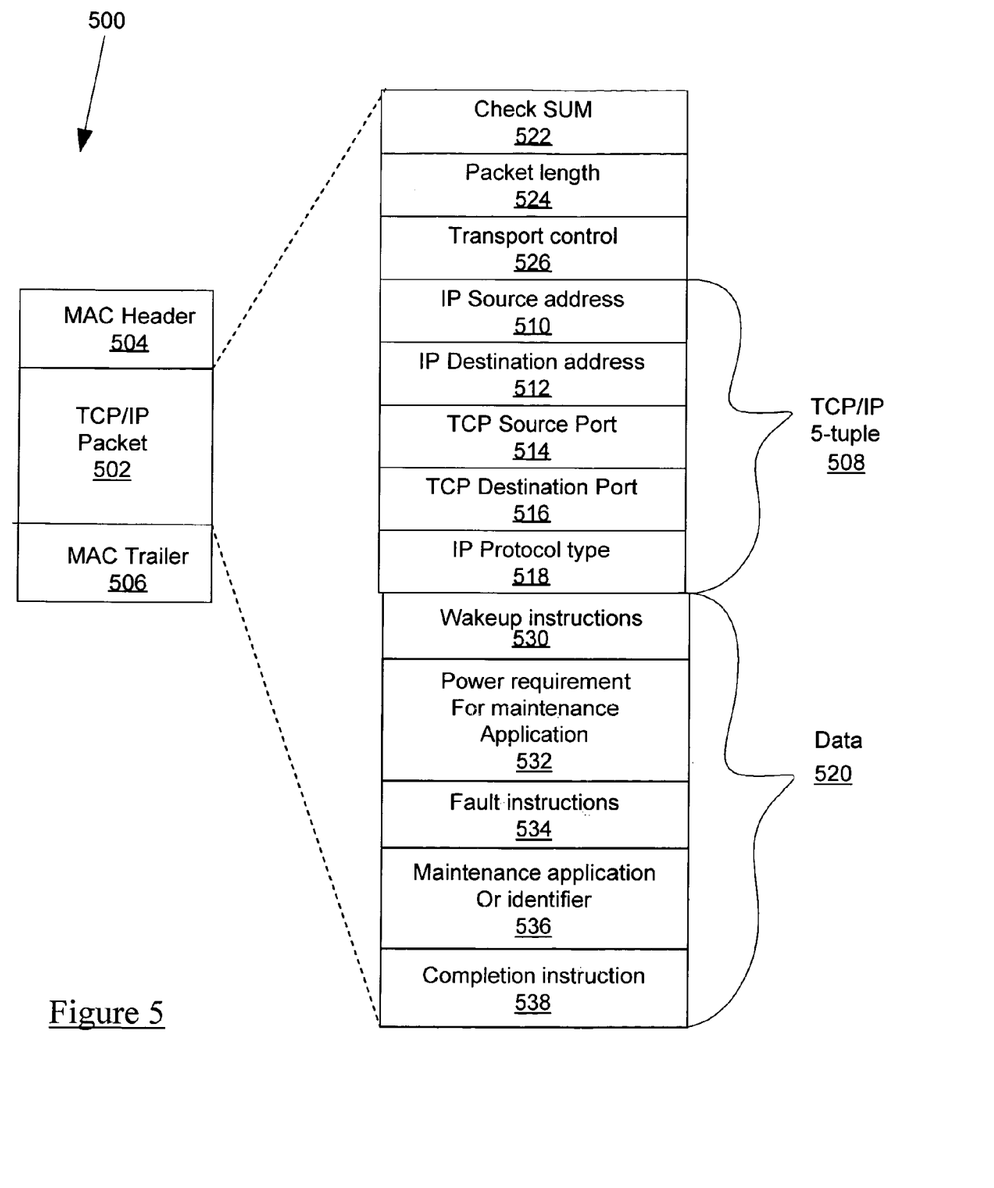
FIG. 5 illustrates an exemplary data packet, from the managing server to the client computer, that contains a maintenance application and power requirement for the maintenance application.

For additional detail regarding the maintenance packet discussed in block 404 of FIG. 4, reference is now made to FIG. 5, which depicts an exemplary maintenance packet 500 used by the present invention. Maintenance packet 500 is a transmission unit that uses the Transmission Control Protocol/Internet Protocol (TCP/IP) protocol. Information transmitted over a TCP/IP protocol network is encapsulated in a TCP/IP packet 502 before being wrapped in the appropriate link layer headers and trailers, such as media access control (MAC) header 504 and MAC trailer 506, and sent over the network.

In the Open System Interconnection (OSI) networking model, the data link layer can be split into two functions: media access control (MAC) and logical link control (LLC). MAC deals with how to get data into the correct physical form (e.g., electrical voltages) to access the physical layer. LLC handles the addressing of a data packet to get from one piece of hardware to another on the same network. The MAC and LLC layers add a MAC header 504 and a MAC trailer 506, and put the resulting frame on the physical network. (At this level, the data packet, or data gram, is referred to as a frame.) As such, the LLC is utilized by a router, such as routers 112 shown in FIG. 1, and responds to a request from the network layer to send a packet from the system to a remote system by establishing a path to that remote system and returning control to a network layer where a processing of the actual packet contents takes place. In packets utilizing the IP and/or TCP/IP protocol, TCP/IP packet 502 includes both data 520, described below, as well as a TCP/IP "5-tuple" 508. TCP/IP 5-tuple 508 includes IP source address 510, IP destination address 512, TCP source port 514, TCP destination port 516, and IP protocol type 518. TCP/IP packet 502 typically also includes a check sum 522 (for performing check sum error detection), packet length 524 (for giving the length of TCP/IP packet 502), and transport control 526 (describing the pathway and routers the packet has passed through on its way to its destination). It should be noted that individual fields are not illustrated in the order they appear in a packet, but are grouped for convenience of description.

Data 520 includes wake-up instructions 530, which is preferably a "Magic Packet," about which more is discussed in detail below. Also included in data 520 are power requirements 532 for a maintenance application 536 (or its location within local computer 102), as well as instructions to be followed in the event of a failure (fault instructions 534) or successful execution of maintenance application (completion instruction 538).

Additional detail is now given regarding block 412, which relates to waking up the client computer. There are two primary ways to wake a computer up. The first is referred to as Wake On Modem (WOM). In a WOM scheme, a modem (e.g., NIC) has a physical connection to a power supply for the client computer. If the client computer is turned off, a call to the NIC automatically turns the power supply on, allowing the client computer to boot up.

The second, and preferred way to wake up the client computer, utilizes an Advanced Configuration and Power Interface (ACPI) protocol. The details of the ACPI protocol are described in "Advanced Configuration and Power Interface Specification, Revision 2.0c," published Aug. 25, 2003 by Compaq Computer Corporation, Intel Corporation, Microsoft Corporation, Phoenix Technologies Ltd., and Toshiba Corporation, which is herein incorporated by reference in its entirety, either as the version cited or any other subsequent version. ACPI provides a standards-based platform that enables network managers to remotely administer and manage client computers.

The ACPI protocol defines different power states in a computer. The global system state definitions are G3 through G0.

G3 is "Mechanical Off." This state is entered and left by a mechanical means, such as turning off the computer's power switch. When coming out of the G3 state, the computer must be re-booted. Thus, only a system such as WOM described above would be appropriate when the client computer is in the G3 state.

G2 is "Soft Off." In this state, the computer consumes a minimal amount of power. No code is run, and a large latency is required to return the computer to a working (G0) state since the computer's context is not preserved in hardware, and must be restarted to return to the G0 state.

G1 is "Sleeping." In this state, the computer uses a small amount of power, user mode threads are not executed, but most of the context states are preserved, thus making a re-start faster. G1 has sublevels S1 through S4, which further define how "deep" the sleeping state is.

G0 is "Working." In this state, the computer itself is at full operation capacity, although peripheral devices may be in reduced power states.

Figure 6:
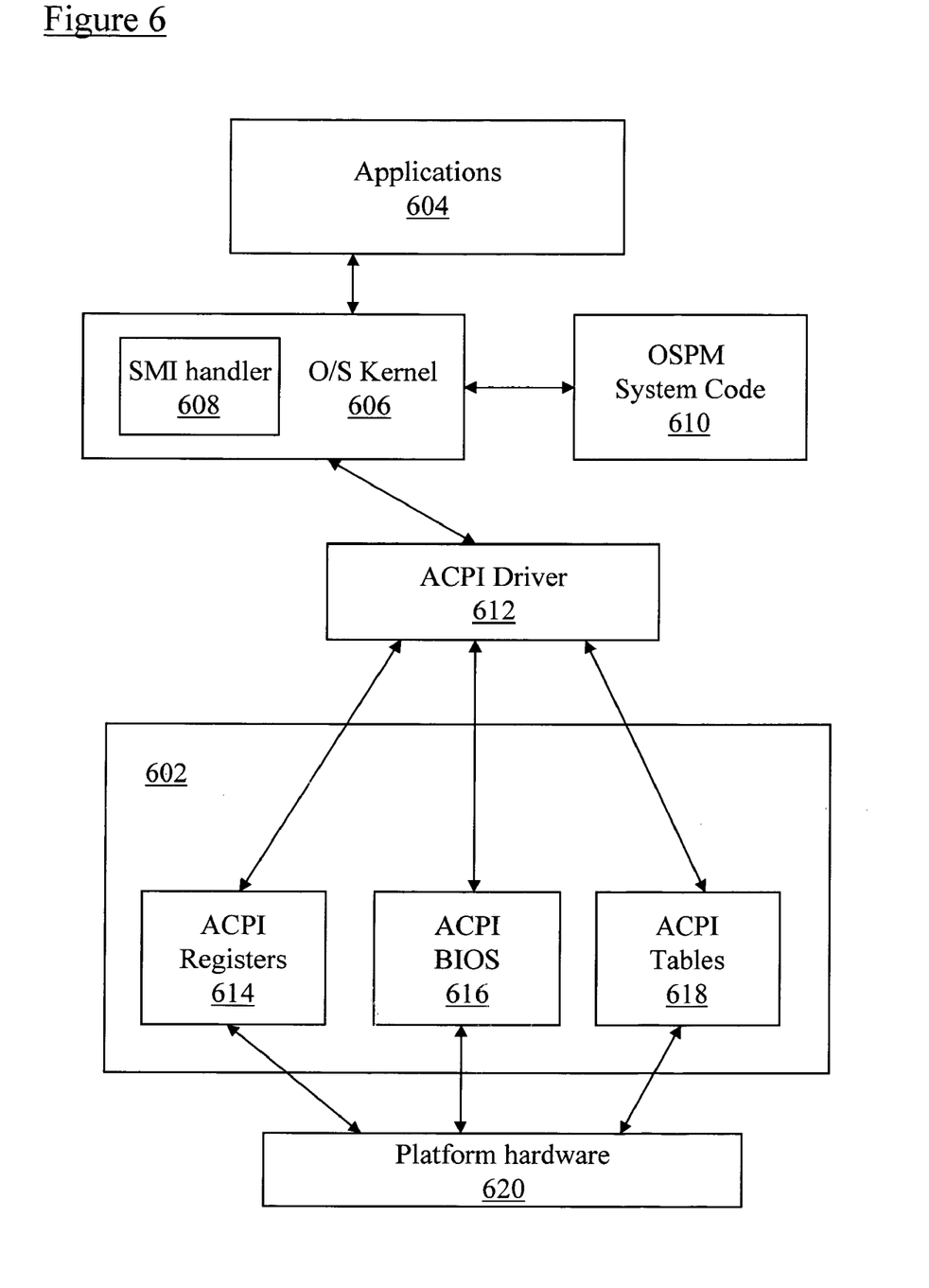
FIG. 6 depicts the Advanced Configuration and Power Interface (ACPI) software between the client computer's software and hardware.

With reference now to FIG. 6, there is depicted a diagram of the hardware/software structure of ACPI software 602. ACPI software 602 interfaces between software, such as applications 604, operating system (OS) kernel 606, which includes System Management Interrupt (SMI) code 608, Operating System-directed Power Management (OSPM) 610, and ACPI driver 612; and platform hardware 620, such as but not limited to CPU 202 described in FIG. 2.

ACPI 602 includes three run-time components: ACPI System Description Tables 618, ACPI Registers 614, and ACPI System Firmware (BIOS) 616. ACPI System Description Tables 618 described the interfaces to platform hardware 620. ACPI System Firmware (BIOS) 616 is the portion of the BIOS associated in the BIOS of client computer 102 that is compatible with the ACPI specification. This code boots the client computer 102 and implements interfaces for sleep, wake and some restart operations. ACPI Registers 614 include the constrained part of the hardware interface, described by the ACPI System Description Tables 618.

Assuming client computer 102 is ACPI compliant, client computer 102 can be awaken either using Microsoft's® OnNow™ scheme, or preferably IBM's® Wake On Lan (WOL) scheme. WOL sends a signal from a NIC to the CPU of the client computer 102 when a "Magic Packet"™ is received at the NIC. The magic packet is a packet that follows the Magic Packet™ protocol devised by Advanced Micro Devices (AMD) to trigger the remote wake-up of the client computer via the network connection in the NIC. The magic packet starts with $FF_{hex}$ followed by the client computer's Media Access Control (MAC) address repeated 12 times. The MAC address is the unique hardware number of client computer 102. The MAC address is used by the MAC sublayer of Data Link Layer 2 of the Open System Interconnection (OSI) model. A correspondence table relates the IP address of the client computer 102 with the client computer's MAC address. Preferably, the MAC address is stored in non-volatile memory in the NIC of the client computer 102, allowing the NIC to screen incoming packets according to the stored MAC address. Thus, when the NIC receives a magic packet that matches the MAC address of the client computer 102, a routine is begun to wake up client computer 102 from whatever sleeping ACPI state client computer 102 is in.

Figure 7:
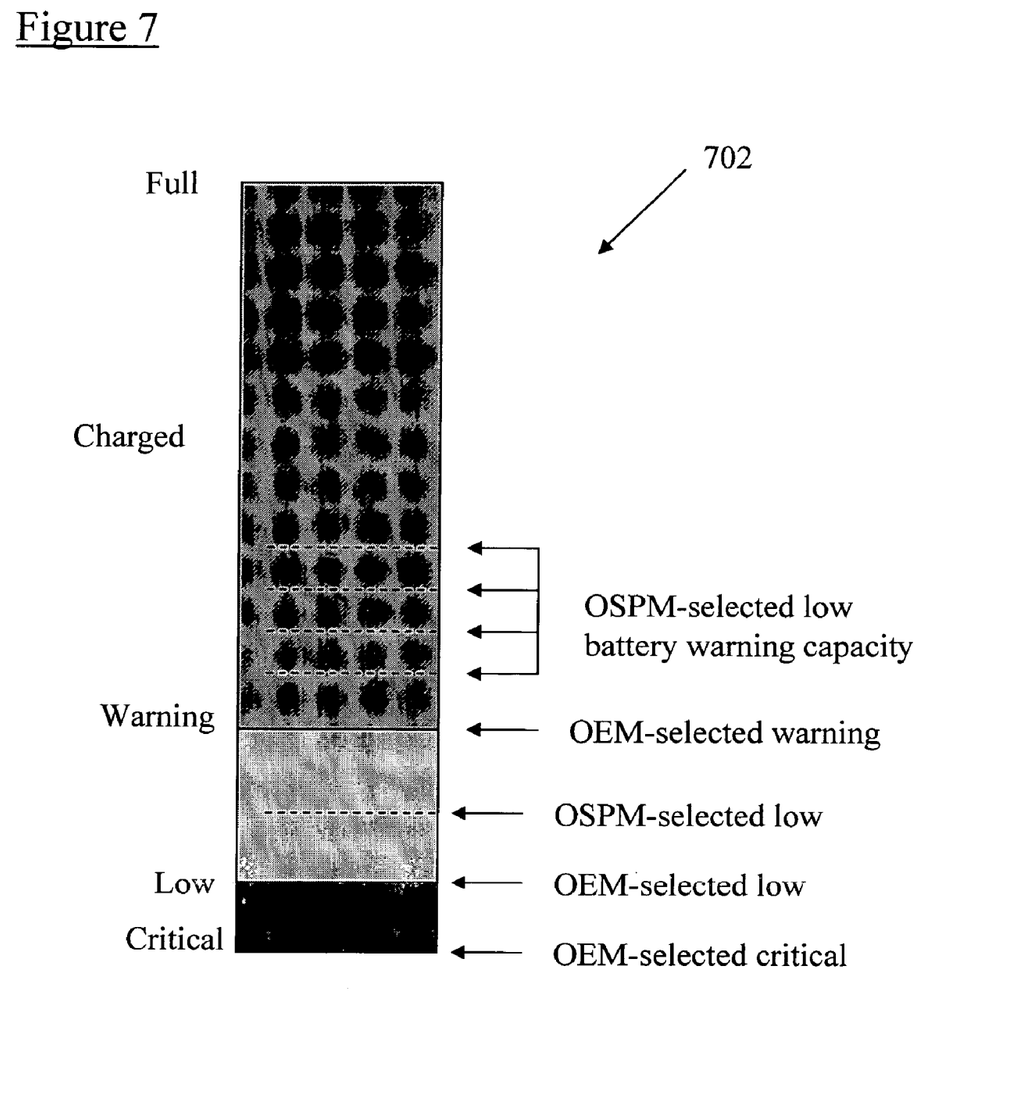
FIG. 7 illustrates a battery power gauge utilized by the client computer.

Referring now to FIG. 7, there is depicted a battery gauge 702, which is a graphical representation of the amount of battery life remaining in battery 226, as determined by battery controller 224 (shown in FIG. 2). Battery gauge 702 has five main levels: full, charged, warning, low and critical. A full level indicates the amount of charge stored during the last full charging operation. A charged level indicates that the battery has sufficient power left to perform normal operations.

A warning level indicates that the remaining power is getting close to a low level. When the total available energy (mWh) or capacity (mAh) in the battery falls to the warning level, the operating system will notify the user of local client computer 102 with a warning, either visual (on a graphical user interface GUI) or aural, that the amount of time remaining to operate the client computer 102 is limited. This allows the user to complete any important work, change the battery, or find a power outlet to plug local client computer 102 in. The warning level can be set by the operating system (Operating System Power Management—OSPM), or by the Original Equipment Manufacturer (OEM) that built the battery. Preferably, the warning level defined by the OSPM is higher than that set by the OEM, as shown in FIG. 7.

When the power level drops below the warning level, it is at the low level, which can also be set by the OSPM or the OEM, as depicted. The low level is an estimation of the amount of energy or battery capacity required by local client computer 102 to transition to any supported sleeping state, about which more will be discussed below. When the operating system (OS) detects that the total available battery capacity is at the low level, the OS will transition local client computer 102 to a user defined system state, such as a sleeping state described below in the Advanced Configuration and Power Interface (ACPI) specification discussed below. In most situations, the transitioned to state is S4 so that system state is not lost if the battery eventually becomes completely empty.

If the power level drops into the critical level, there is only enough power left to allow the local client computer 102 to shut down. The critical level is preferably set by the OEM.

Referring again to block 414 of FIG. 4, the process of determining if enough battery power remains to safely complete the execution of the maintenance application can be done in a variety of manners. The power requirement block 532 shown in FIG. 5 may be any of a variety of values. That is, power requirement block 532 may be a number of operations (cycles) required to perform the maintenance application. If so, then the amount of power needed to run the application must be calculated, either by the client computer or by the managing server, according to known power consumption rates of the client computer 102. These calculations can be stored in either the client computer or server for later use.

Alternatively, the power requirement block 532 may be a raw battery power number, assuming that the managing server 120 knows the power usage rate of client computer 102. If a raw battery power number, then the client computer simply compares the remaining battery power level, as discussed in FIG. 7, with that mandated by the maintenance packet.

Any other alternative figure, which can be used by the client computer 102 and/or the managing server 120 to calculate how much battery power is needed to execute the maintenance application may be used, and this alternate figure then compared to the remaining battery power in the client computer 102.

The present invention has been described in relation to particular embodiments that are intended in all respects to be illustrative rather than restrictive. Alternative embodiments will become apparent to those skilled in the art to which the present invention pertains without departing from its spirit and scope. For example, although the present invention has been described in accordance with a remote computer in a power down mode, it will be appreciated that the systems and principles described herein may also be useful in a computer that is operating in full power mode by having the network interface card send an interrupt only when it receives a packet that the computer needs to process. Moreover, the present invention has been described in accordance with waking a personal computer. However, the design described herein equally applies to any other computers, servers, network peripherals or network servers. Accordingly, the scope of the present invention is defined by the appended claims rather than the foregoing discussion.

What is claimed is:

1. A method comprising:
    detecting a transmitted packet of data, the transmitted packet of data including:
        a destination address for a data processing system that is powered by a battery,
        a set of instructions to be executed by the data processing system, and
        a power requirement to execute the set of instructions on the data processing system;
    comparing the power requirement to execute the set of instructions with a remaining power in the battery;
    in response to determining that the remaining power in the battery is sufficient to complete an execution of the set of instructions on the data processing system, executing the set of instructions on the data processing system;
    in response to determining that the remaining power in the battery is not sufficient to complete the execution of the set of instructions on the data processing system, prohibiting an initiation of the execution of the set of instructions on the data processing system; and
    transmitting a message from the data processing system to a managing computer informing the server that the set of instructions was not executed due to an insufficient amount of remaining power in the battery powering the data processing system.

2. The method of claim 1, wherein the data processing system is a portable computer designed to be powered by the battery during normal operation.

3. The method of claim 2, wherein the portable computer is a device selected from the group consisting of a laptop computer, a tablet computer, a cell phone, and a personal digital assistant (PDA).

4. The method of claim 1, wherein the data processing system is a server designed to be powered by the battery only during a primary power failure.

5. The method of claim 1, further comprising:
    detecting a wake on lan (WOL) message to wake up the computer, wherein if upon receiving the WOL message, the data processing system determines that insufficient battery power is available to wake up the data processing system, non-complying with the WOL message.

6. The method of claim 5, further comprising:
    notifying the managing computer that the data processing system was not awakened because of an insufficiency of battery power.

7. The method of claim 5, wherein the WOL message is in the transmitted packet of data.

8. A system comprising:
    a network interface for detecting a transmitted packet of data, the transmitted packet of data including:
        a destination address for a data processing system that is powered by a battery,
        a set of instructions to be executed by the data processing system, and
        a power requirement to execute the set of instructions on the data processing system;
    a management module for comparing the power requirement to execute the set of instructions with a remaining power in the battery, wherein, in response to determining that the remaining power in the battery is sufficient to complete an execution of the set of instructions on the data processing system, the management module directs the execution of the set of instructions on the data processing system, and wherein, in response to determining that the remaining power in the battery is not sufficient to complete the execution of the set of instructions on the data processing system, the management module prohibits an initiation of the execution of the set of instructions on the data processing system; and
    a network interface card for transmitting a message from the data processing system to a managing computer informing the server that the set of instructions was not executed due to an insufficient amount of remaining power in the battery powering the data processing system.

9. The system of claim 8, wherein the data processing system is a portable computer designed to be powered by the battery during normal operation.

10. The system of claim 9, wherein the portable computer is a battery powered device from a group consisting of a laptop computer, a tablet computer, a cell phone, and a personal digital assistant (PDA).

11. The system of claim 8, wherein the data processing system is a server designed to be powered by the battery only during a primary power failure.

12. The system of claim 8, further comprising:
    means for detecting a wake on LAN (WOL) message to wake up the computer, wherein if upon receiving the WOL message, the data processing system determines that insufficient battery power is available to wake up the data processing system, non-complying with the WOL message.

13. The system of claim 12, further comprising:
    means for notifying the managing computer that the data processing system was not awakened because of an insufficiency of battery power.

14. The system of claim 13, wherein the WOL message is in the transmitted packet of data.

15. A product comprising:
    a computer useable medium having computer readable program code stored therein, the computer readable program code in said product being effective when executing to:
    detect a transmitted packet of data, the transmitted packet of data including:
        a destination address for a data processing system that is powered by a battery, a set of instructions to be executed by the data processing system, and
a power requirement to execute the set of instructions on the data processing system;
compare the power requirement to execute the set of instructions with a remaining power in the battery;
in response to determining that the remaining power in the battery is sufficient to complete an execution of the set of instructions on the data processing system, execute the set of instructions on the data processing system;
in response to determining that the remaining power in the battery is not sufficient to complete the execution of the set of instructions on the data processing system, prohibit an initiation of the execution of the set of instructions on the data processing system; and
transmit a message from the data processing system to a managing computer informing the server that the set of instructions was not executed due to an insufficient amount of remaining power in the battery powering the data processing system.

16. The product of claim 15, wherein the code is further effective to:
detect a wake on LAN (WOL) message to wake up the computer, wherein if upon receiving the WOL message, the data processing system determines that insufficient battery power is available to wake up the data processing system, non-complying with the WOL message.

17. The product of claim 16, wherein the WOL message is in the transmitted packet of data.

* * * * *